US008269394B2

(12) United States Patent
Pierson et al.

(10) Patent No.: US 8,269,394 B2
(45) Date of Patent: Sep. 18, 2012

(54) EXTRUSION COATED PLANE COMMUTATOR

(75) Inventors: Andrew Pierson, Buehl (DE); Dirk Altmeyer, Buehl (DE); Helmut Huber, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 488 days.

(21) Appl. No.: 12/443,592

(22) PCT Filed: Aug. 1, 2007

(86) PCT No.: PCT/EP2007/057940

§ 371 (c)(1), (2), (4) Date: Sep. 16, 2009

(87) PCT Pub. No.: WO2008/040586

PCT Pub. Date: Apr. 10, 2008

(65) Prior Publication Data

US 2010/0019615 A1 Jan. 28, 2010

(30) Foreign Application Priority Data

Sep. 29, 2006 (DE) ......................... 10 2006 046 669

(51) Int. Cl.
*H02K 13/04* (2006.01)
*H01R 39/04* (2006.01)
*H01R 39/32* (2006.01)
*H01R 39/00* (2006.01)

(52) U.S. Cl. ........ 310/237; 310/235; 310/233; 310/234; 310/236

(58) Field of Classification Search ........... 310/233–237
See application file for complete search history.

(56) References Cited

U.S. PATENT DOCUMENTS 5,157,299 A 10/1992 Gerlach
5,629,576 A 5/1997 Shimoyama
6,242,838 B1 * 6/2001 Kiyose et al. ................. 310/233
6,525,445 B2 * 2/2003 Kiyose et al. ................. 310/233
6,617,743 B1 * 9/2003 Potocnik et al. .............. 310/237
6,667,565 B2 * 12/2003 Strobl ........................... 310/237
6,789,306 B1 * 9/2004 Konig ............................. 29/597
7,019,432 B1 * 3/2006 Potocnik ........................ 310/237
7,051,422 B2 * 5/2006 Sugiyama ........................ 29/597
2003/0020360 A1 1/2003 Luedtke
2004/0150280 A1 * 8/2004 Moroto et al. ........... 310/154.28
2006/0108398 A1 * 5/2006 Verheijen ................. 228/180.21

FOREIGN PATENT DOCUMENTS

DE 4028420 A1 3/1992
DE 19903921 A1 8/1999
WO 0219478 A1 3/2002

* cited by examiner

*Primary Examiner* — Quyen Leung
*Assistant Examiner* — Terrance Kenerly
(74) *Attorney, Agent, or Firm* — Ronald E. Greigg

(57) ABSTRACT

The invention relates to a commutator with contact segments, arranged at a distance from each other and forming a brush running surface. Each contact segment is soldered to a securing portion of a metal segment support piece. The commutator has a hub body made from an electrically insulating material which supports the segment support pieces which are each provided with a winding connector hook. According to the invention, at least one solder barrier recess is provided in the upper side of the securing portion facing the contact segment and/or in the under side of the contact segment facing the securing portion.

19 Claims, 1 Drawing Sheet

EXTRUSION COATED PLANE COMMUTATOR

CROSS-REFERENCE TO RELATED APPLICATION

This application is a 35 USC 371 application of PCT/EP 2007/057940 filed on Aug. 1, 2007.

BACKGROUND OF THE INVENTION

1. Field of the Invention

The invention relates to a commutator.

2. Description of the Prior Art

From International Patent Disclosure WO 02/19478 A1, a hook commutator for an electric motor armature is known. The known commutator has many spaced-apart metal segment support pieces, each with one securing portion that digs into a hub body and connected solidly and electrically conductively to a carbon contact segment, and the contact segments as a total form a brush running surface. The securing portion of each segment support piece is adjoined in the axial direction by an axial portion, on the end of which a winding connection hook is provided with which a winding wire can be connected electrically. In the production of the electric motor armature, one winding wire is wound in each winding connection hook. In a required connection process of the winding wire and winding connection hooks, a durably good mechanical and electrical connection quality of the winding connection hooks and winding wire is crucial. So-called hot staking is used as a connection process. In it, the winding connection hook is deformed in such a way that the winding wire is clamped in place. After that, an electrical voltage is applied, so that the winding connection hook and the winding wire heat up. In this process, an insulation layer detaches from the winding wire, and welding of the winding wire and winding connection hook takes place. It is also known from this reference, in the transition region between the axial portion and the securing portion of the segment support piece, to provide a region of reduced cross-sectional area, in order to reduce the thermal conduction from the winding connection hook to the securing portion, among other reasons in order to avoid an impairment of the soldered connection between the contact segment and a securing portion in the hot staking process.

In the production of the soldered connection between the carbon contact segments and the associated securing portions, problems repeatedly arise. This can be ascribed to the fact that in the liquid state of the solder, the intermolecular forces of adhesion between the liquid solder and the contact segment and/or between the solder and the metal securing portion are greater than the intermolecular forces of cohesion within the solder. This causes a capillary diffusion of the liquid solder into surface regions not moistened by the liquid solder—above all in the peripheral and corner regions of the carbon segment and securing portion. Often, solidifying droplets of solder even protrude laterally. They protrude partly past the air gap between two adjacent securing portions and thus cause dangerous electrical short circuits. It also happens that protruding solder particles, in operation of the finished electrical machine, come loose and reach the region of the motor winding, where they cause short circuits. Also, a fuel pump through which fuel is flowing and which is equipped with the known commutator can be damaged by detaching solder particles. To avoid laterally protruding solder particles, attempts are made to reduce the quantity of solder. However, this leads to unwanted reduced strength and reduced electrical conductivity of the connections comprising the contact segments and the associated securing portions.

OBJECT AND SUMMARY OF THE INVENTION

It is therefore the object of the invention to propose a commutator in which, preferably without reducing the quantity of solder, solder projections protruding laterally at the securing portions are avoided.

The invention is based on the concept of introducing an indentation, in particular an elongated indentation, which serves as a solder barrier and at least regionally prevents the solder from flowing past the circumferential edge of the securing portion or the contact segment, into the securing portion, preferably a copper or copper alloy, of the segment support piece and/or into the underside, oriented toward the securing portion, of the contact segments, which are preferably made from a carbon-graphite mixture. This kind of solder barrier indentation can easily be embossed or stamped in the securing portion in the production of the segment support piece. The depth and width of the solder barrier indentation should be dimensioned such that it can hold enough liquid solder to prevent a solder from spilling over from the solder barrier indentation.

Preferably, the solder barrier indentation completely defines a soldering face that is to be provided with solder during the connection process. However, it is also conceivable to provide a solder barrier indentation only in some regions, so that only the most-threatened regions, especially the air gaps, which are provided in the circumferential direction between two adjacent contact segments, are protected against the penetration of liquid solder.

If the commutator is embodied as a flat commutator with a level brush running surface, and the securing portion is formed by a radial portion of the segment support piece, it is advantageous to dispose the solder barrier indentation at least in a radially outer region of the securing portion, to prevent an escape of liquid solder on the circumferential side of the commutator.

To achieve as large as possible a soldering face and hence good strength and electrical conductivity of the connections of the contact segments and securing portions, it is provided in an advantageous refinement of the invention that the solder barrier indentation is disposed with a slight peripheral spacing on the underside of the contact segment and/or on the top side of the securing portion. The solder barrier indentation is preferably embodied as a circumferentially closed, trenchlike indentation.

To protect the soldered connection between one contact segment and the associated securing portion against harmful thermal influence, especially in a hot staking process for securing a winding wire on the winding connection hook of the associated segment support piece, it is advantageously provided in a feature of the invention that, in a region between the winding connection hook and the securing portion, a heat barrier region with a reduced cross-sectional area is provided. As a result of the reduction of the effective cross-sectional area, the flow of heat from the winding connection hook in the direction of the securing portion and thus in the direction of the soldered connection is worsened, and as a result, adverse effects of the hot staking process on the soldered connection are advantageously avoided.

Expediently, the effective cross-sectional area in the heat barrier region is reduced by providing that at least one, preferably intermittently curved-contoured, circumferentially closed, or peripherally open, recess is made in the segment support piece.

Preferably, the heat barrier region is embodied between two peripherally open recesses spaced apart in the circumferential direction, which in particular are curved inward, so that only this slight cross-sectional area region is available for heat transfer in the direction of the securing portion. Expediently, the length of the heat barrier region in the circumferential direction is at least approximately equivalent to the length of the winding connection hook in the circumferential direction.

Still further-improved heat protection is provided by an expedient refinement of the invention. In the production of the commutator, a metal stamped and bent part, particularly of copper, is used, which has segment support pieces disposed side by side in the circumferential direction. Preferably, one solder barrier indentation is introduced into each of these segment support pieces. Each segment support piece has one winding connection hook and one securing portion for the fixation of a contact segment. Each two adjacent segment support pieces are connected to one another via a preferably curved rib oriented in the circumferential direction. Otherwise, there is only an air gap between the adjacent segment support pieces. Taken as a whole, all the ribs form a circular-annular connection. In the invention, it is now provided that this circular-annular connection is spaced apart as far as possible from the winding connection hooks, preferably in the region of the free end, remote from the winding connection hooks, of the securing portions. The reason is accordingly as follows. In the course of further production of the commutator, a contact disk is first soldered to the securing portions. Next, the component comprising the metal stamped and bent part and the contact disk, which is preferably of carbon or a carbon-graphite mixture, is partially extrusion-coated with an insulating material, preferably a pressed material, in particular a thermosetting plastic with reinforcing elements, such as glass fibers or glass fiber beads. The metal sides facing toward one another of the segment support pieces are likewise extrusion-coated in the process. To attain an electrical insulation of the segment support pieces from one another, the contact disk must be subdivided in a further step into individual contact segments. Moreover, all of the connecting ribs between the segment support pieces must be removed. This is done for instance by a sawing operation, in which the width of the saw or the saw blade is preferably less than the air gap between two adjacent segment support pieces. After the connecting ribs have been severed, two free metal faces, that is, metal faces that are not insulated from the hub body, remain on each segment support piece, and by way of them, heat can “flow into” the segment support piece or its securing portion especially well and thus have an adverse effect on the soldered connection with the associated contact segment. Because the spacing according to the invention of the connecting ribs (and thus of the free metal faces) from the winding connection hooks that are heated during the hot staking process is as great as possible, only a minimal amount of heat is introduced via these free faces into the associated securing portions, which has an advantageous effect on the soldered connection between the securing portion and the contact segment.

The invention pertains not solely to the finished commutator but also to the annular stamped and bent part, particularly of copper or copper alloy, for its production, in which the connecting ribs between the individual segment support pieces are located as far away as possible from the winding connection hooks.

BRIEF DESCRIPTION OF THE DRAWINGS

Further advantages, characteristics and details of the invention will become apparent from the ensuing description of preferred exemplary embodiments as well as from the drawings, which show.

DESCRIPTION OF THE PREFERRED EMBODIMENTS

Figure 1:
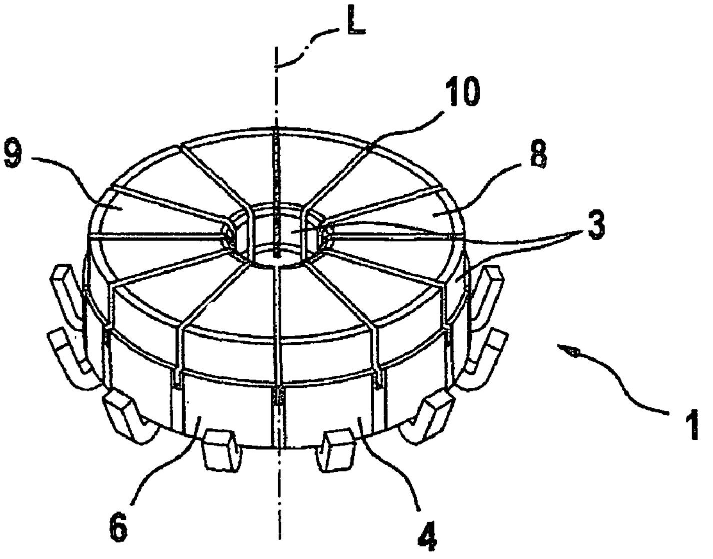
FIG. 1 is a perspective view of a commutator embodied as a flat commutator.

In the drawings, identical components and components with the same function are identified by the same reference numerals.

In the drawings, a commutator 1 embodied as a flat commutator is shown for an otherwise known electrical machine (not shown). It is understood that the invention can also be implemented in a commutator with a brush running surface disposed on the jacket face. The commutator 1 is embodied symmetrically to a longitudinal axis L and in the assembled state is mounted in a manner fixed against relative rotation on an armature shaft, not shown, that penetrates a central receiving opening in the commutator.

The commutator 1 has a hub body 3, embodied as a plastic injection-molded part, which has a plurality of copper segment support pieces 4 distributed over the circumference and spaced apart from one another. In the commutator 1 embodied as a flat commutator, each segment support piece 4 has a platelike securing portion 5, embodied as a radial portion and shown in FIG. 2, and an axial portion 6, angled 90° from the securing portion, and the axial portion, on its end remote from the securing portion 5, has a winding connection hook 7. The winding connection hooks 7 are curved in the direction of a level brush running surface 8 toward the face end.

The brush running surface 8 is formed by many contact segments 9 of carbon or a carbon-graphite mixture. One securing portion 5 of a segment support piece 4 is associated with each radially inward-tapering contact segment 9, and each contact segment 9 is soldered solidly and electrically conductively to the associated securing portion 5. The contact segments 9 are metallized in a known manner on the side oriented toward the securing portions 5.

In the circumferential direction, each two adjacent contact segments 9 are insulated electrically from one another via a radially extending air gap 10.

Figure 2:
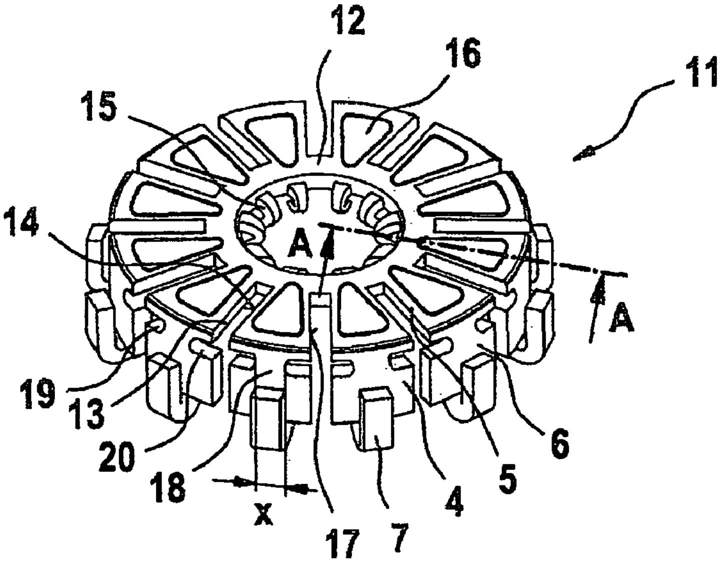
FIG. 2 shows a stamped and bent part for producing a commutator.

In FIG. 2, a stamped and bent part 11 (base) is shown that is needed for producing the commutator. The stamped and bent part 11 has many segment support pieces 4, adjacent one another in the circumferential direction, and each two adjacent segment support pieces 4 are connected to one another via a connecting rib 12. A contact disk (not shown) that later forms the contact segments 9 is soldered onto the stamped and bent part 11, whereupon the unit comprising the stamped and bent part 11 and the contact disk is partially extrusion-coated with hub body material; among others, the sides 13, 14 facing toward one another of the securing portions 5 are extrusion coated. To insulate the individual segment support pieces 4 electrically form one another, the connecting ribs 12 must be separated from one another in a further step, in particular by means of a sawing process.

So that the then-created free metal faces are spaced apart as far as possible from the winding connection hooks 7, the connecting ribs 12 are disposed on the inside radius of the stamped and bent part 11. Only anchoring claws 15 pointing obliquely downward, which can optionally also be dispensed with, protrude obliquely inward in the radial direction past the connecting ribs 12.

Figure 3:
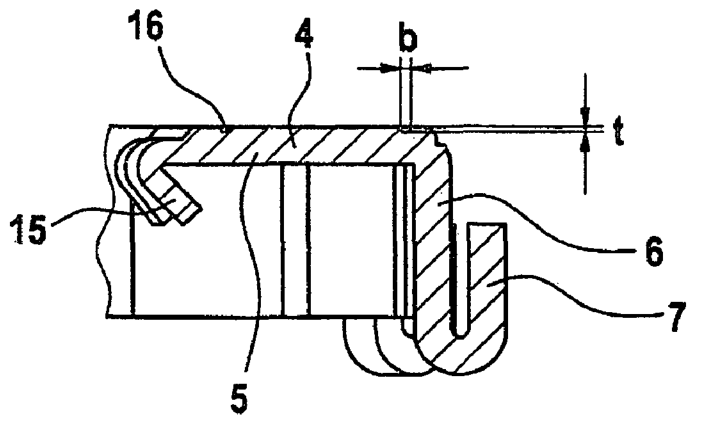
FIG. 3 is a fragmentary sectional view of the stamped and bent part along the section line A-A in FIG. 2.

As can be seen from FIGS. 2 and 3, a solder barrier indentation 16 is stamped into each securing portion 5 and is intended to prevent a flow of solder past the edge 17 of the securing portions 5. The solder barrier indentation 16 is a circumferentially closed, essentially triangularly contoured, trenchlike indentation with a depth t and a width b. The spacing of the solder barrier indentation 16 from the edge 17 is equivalent to approximately one to two times the width b of the solder barrier indentation 16.

On the upper end, in the plane of the drawing, of the axial portions 6, or in other words directly adjacent the respective securing portion 5, a heat barrier region 18 is provided, which worsens the conduction of heat from the winding connection books 7, particularly in a hot staking process for securing a winding wire in the direction of the securing portion 5. The cross-sectional area of the heat barrier region 18 is reduced in comparison to the cross-sectional area of the axial portion 6 in a region in the vicinity of the winding connection hook 7. The cross-sectional area reduction is implemented by means of two diametrically opposed peripherally open recesses 19, 20 each, which on their inner end, toward one another, are contoured in curved fashion. The length x of the heat barrier region 18 in the circumferential direction is approximately equivalent to the length x of the associated winding connection hook 7 in the circumferential direction.

The foregoing relates to the preferred exemplary embodiment of the invention, it being understood that other variants and embodiments thereof are possible within the spirit and scope of the invention, the latter being defined by the appended claims.

The invention claimed is:

1. A commutator, comprising:

contact segments which form a brush running surface and are spaced apart from one another and are each soldered to a respective securing portion of a metal segment support piece; and a hub body made of an electrically insulating material, which has likewise spaced-apart segment support pieces that are provided each with one winding connection hook, wherein at least one solder barrier indentation is introduced into a top side, oriented toward one of the contact segments, of at least one of the securing portions and/or into an underside, oriented toward one of the securing portions, of at least one of the contact segments, wherein the solder barrier indentation is disposed extending at least approximately in a circumferential direction, axially between a soldering face and winding connection hook.

2. The commutator as defined by claim 1, wherein the solder barrier indentation surrounds the soldering face at least partially.

3. The commutator as defined by claim 2, wherein the solder barrier indentation is disposed with a slight peripheral spacing on the underside of the contact segment and/or the top side of the securing portion.

4. The commutator as defined by claim 2, wherein each side of the securing portion, pointing in a direction of the adjacent securing portions, is extrusion-coated by the hub body, except for a free metal face, and free metal faces are disposed spaced apart from an axial portion of the segment support piece, which portion supports the winding connection hook.

5. The commutator as defined by claim 1, wherein the solder barrier indentation is disposed with a slight peripheral spacing on the underside of the contact segment and/or the top side of the securing portion.

6. The commutator as defined by claim 5, wherein a cross-sectional area of at least one of the segment support pieces, in a heat barrier region disposed between the securing portion and the winding connection hook, is less than in a region between the heat barrier region and the winding connection hook.

7. The commutator as defined by claim 6, wherein a length of the heat barrier region in a circumferential direction is at least approximately equivalent to a length of the winding connection hook in the circumferential direction.

8. The commutator as defined by claim 1, wherein a cross-sectional area of at least one of the segment support pieces, in a heat barrier region disposed between the securing portion and the winding connection hook, is less than in a region between the heat barrier region and the winding connection hook.

9. The commutator as defined by claim 8, wherein a cross-sectional area in the heat barrier region is reduced by means of at least one and preferably intermittently curved-contoured, circumferentially closed, or peripherally open recess in the segment support piece.

10. The commutator as defined by claim 9, wherein two peripherally open recesses spaced apart in a circumferential direction are provided.

11. The commutator as defined by claim 9, wherein a length of the heat barrier region in a circumferential direction is at least approximately equivalent to a length of the winding connection hook in the circumferential direction.

12. The commutator as defined by claim 8, wherein two peripherally open recesses spaced apart in a circumferential direction are provided.

13. The commutator as defined by claim 12, wherein a length of the heat barrier region in the circumferential direction is at least approximately equivalent to a length of the winding connection hook in the circumferential direction.

14. The commutator as defined by claim 8, wherein a length of the heat barrier region in the circumferential direction is at least approximately equivalent to a length of the winding connection hook in the circumferential direction.

15. The commutator as defined by claim 1, wherein each side of the securing portion, pointing in a direction of the adjacent securing portions, is extrusion-coated by the hub body, except for a free metal face, and free metal faces are disposed spaced apart from an axial portion of the segment support piece, which portion supports the winding connection hook.

16. The commutator as defined by claim 15, wherein each free metal face is disposed in a region of a free end of the securing portion.

17. An annular stamped and bent part for producing a commutator as defined by claim 1, having a plurality of segment support pieces disposed side by side in a circumferential direction, each having one winding connection hook, and each two adjacent segment support pieces are connected to one another via a connecting rib, wherein each connecting rib is disposed on an end region of the segment support pieces, remote from the winding connection hook.

18. The commutator as defined by claim 1, wherein the solder barrier indentation surrounds the soldering face completely.

19. A commutator, comprising:

contact segments which form a brush running surface and are spaced apart from one another and are each soldered to a respective securing portion of a metal segment support piece; and a hub body made of an electrically insulating material, which has likewise spaced-apart segment support pieces that are provided each with one winding connection hook, wherein at least one solder barrier indentation is introduced into a top side, oriented toward one of the contact segments, of at least one of the securing portions and/or into an underside, oriented toward one of the securing portions, of at least one of the contact segments, wherein a cross-sectional area of at least one of the segment support pieces, in a heat barrier region disposed between the securing portion and the winding connection hook, is less than in a region between the heat barrier region and the winding connection hook, wherein a cross-sectional area in the heat barrier region is reduced by means of at least one and preferably intermittently curved-contoured, circumferentially closed, or peripherally open recess in the segment support piece, and wherein a length of the heat barrier region in a circumferential direction is at least approximately equivalent to a length of the winding connection hook in the circumferential direction.

* * * * *